M. BARNETT & L. BURGESS.
ART OF PRODUCING ALUMINUM SULFATE.
APPLICATION FILED DEC. 18, 1916.
1,252,648.
Patented Jan. 8, 1918.
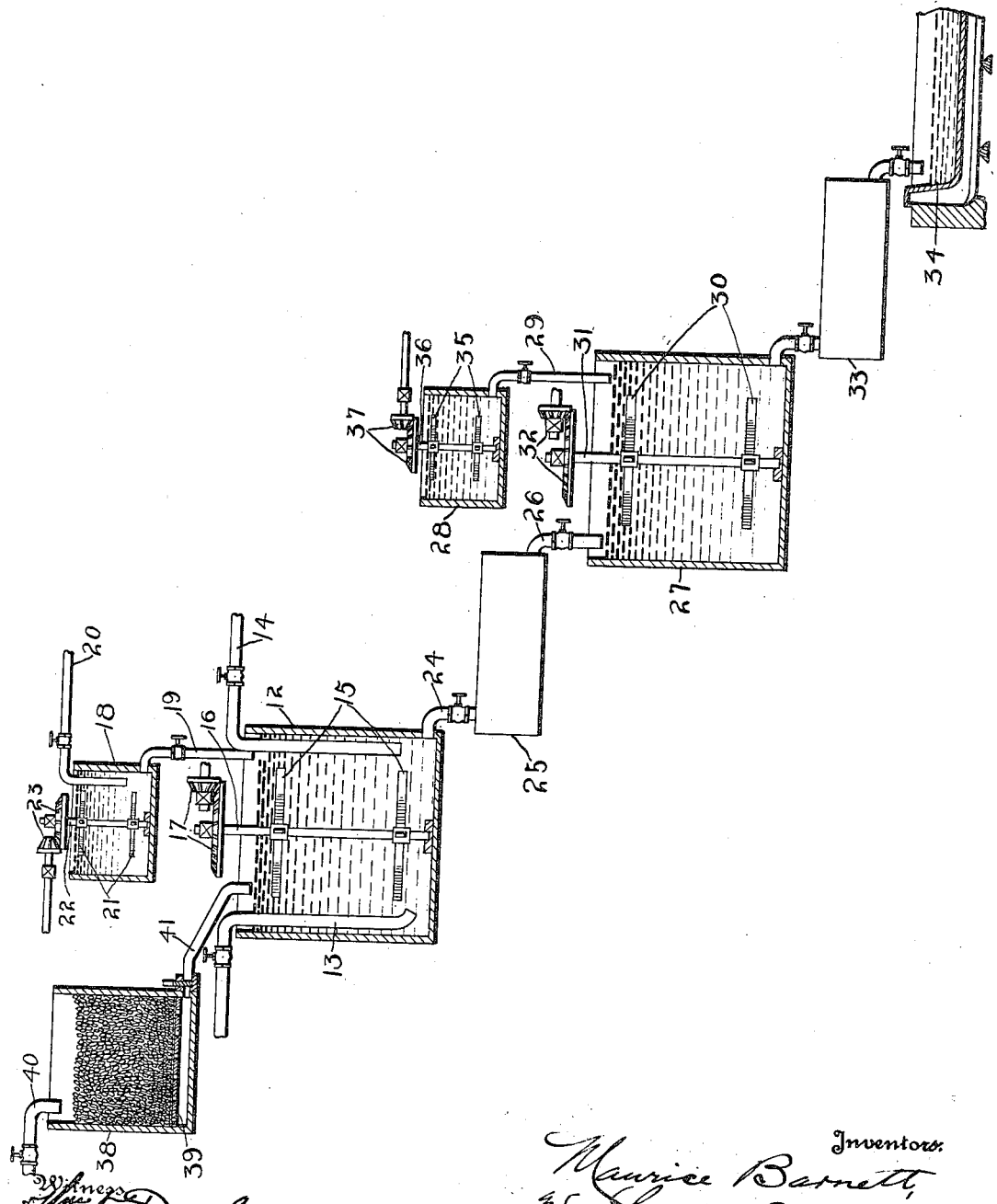

UNITED STATES PATENT OFFICE.

MAURICE BARNETT AND LOUIS BURGESS, OF NEW YORK, N. Y.

ART OF PRODUCING ALUMINUM SULFATE.

1,252,648.  Specification of Letters Patent.  Patented Jan. 8, 1918.

Application filed December 18, 1916. Serial No. 137,713.

*To all whom it may concern:*

Be it known that we, MAURICE BARNETT and LOUIS BURGESS, citizens of the United States, residing at New York, in the county of New York and State of New York, have invented or discovered certain new and useful Improvements in the Art of Producing Aluminum Sulfate, of which the following is a specification, reference being had therein to the accompanying drawing.

This invention relates to the art of producing aluminum sulfate, and has for its object the production of aluminum sulfate from aluminous ores contaminated with iron.

A large industry has been built up in this country, in the production of sulfate of alumina from bauxite, which is a hydrated alumina (approximately $Al_2O_3.2H_2O$) carrying in good grades about 55% to 57% of alumina and only 1% to 2% of iron oxid. In this art as now practised it is necessary to use high grades of bauxite, containing comparatively little iron oxid, as the iron goes into solution with the alumina and is costly to separate therefrom. There are large bodies of low grade bauxite in this country which cannot be used for the manufacture of aluminum sulfate on account of the presence of considerable quantities of iron oxid therein.

Likewise, large quantities of aluminum sulfate mixed with sulfate of iron occur in nature, as "alunogen", "halotrichite", etc. These substances would form a cheap material for the manufacture of aluminum sulfate were it not for the expense of removing the sulfate of iron. There are hundreds of acres of rock heavily impregnated with aluminum sulfate and sulfate of iron in the West which have never been utilized because of the contamination of the aluminum sulfate with sulfate of iron and the expense of removing the iron.

Various methods have been proposed for separating the iron from aluminum sulfate solutions. One method is by dilution. This method is not practicable for the reason that so great an addition of water is necessary to effect dilution as to make the resulting concentration too expensive.

Again, while iron sulfate in the ferric form may be separated from solutions of aluminum sulfate by fractional crystallization, it is a fact that a great deal of the iron co-existing with alumina in bauxite and halotrichite is in the ferrous form and cannot be separated from aluminum sulfate solutions by fractional crystallization.

Various other methods have been suggested for separating the iron from aluminum sulfate solutions, as by precipitation with oxalic acid, sulfureted hydrogen, potassium ferrocyanid, lead peroxid, metantimonic acid, metastannic acid, soda ash and caustic soda. These methods, while valuable in removing the last portions of iron, are expensive, owing to the cost of the reagents and could not be used for the purpose of removing all the iron from aluminum sulfate solutions if the iron were present, as it often is, in as large or larger quantity than the alumina itself.

Various efforts have been made to oxidize iron solutions used in the arts, but up to the present time no satisfactory method has been discovered. The method usually employed is to force air into the solution, or to spray the solution into the air. This method of oxidation is extremely slow and complete oxidation is obtainable only over a long period of time.

We have discovered that by treating solutions of ferrous salts with ozone, or with air that has been ozonated, we are able to completely oxidize all the iron in solution, converting, for instance, ferrous sulfate into ferric sulfate, thereby bringing the iron into a form in which it may be more readily separated from solutions of alumina by other steps, as hereinafter fully set forth.

In practising our process the aluminous material containing iron is first brought into solution, and the solution is then exposed to the action of ozone or ozonated air for the purpose of oxidizing the iron. This oxidizing of the iron in the aluminous solution may be done either by forcing ozone or ozonated air into a tank containing the aluminous solution, and which solution will be thoroughly agitated while being treated with the ozone or ozonated air; or the aluminous solution may be sprayed into a receptacle through which ozone or ozonated air is forced. By this treatment of the aluminous solution with ozone or ozonated air the ferrous iron in the aluminous solution is readily oxidized and is thus converted into the ferric form. After the iron is oxidized the bulk of the iron in the solution is precipitated as hydroxid by the addition, preferably, of powdered carbonate of lime, and the precipitate is removed. The iron remaining in the filtrate can then be separated by fractional crystallization or by precipitation as hydroxid (with one of the well-known precipitants, as caustic soda or soda ash) and filtered off, and the remaining solution be concentrated and cooled, all as more specifically described hereinafter.

The accompanying drawing is a somewhat diagrammatic illustration of an apparatus or equipment which may be used for the separation of iron from aluminum sulfate solutions, and more particularly those obtained from alunogen or halotrichite, but any other suitable apparatus or equipment may be used in carrying out our new process.

Referring to the drawing, 12 denotes a tank adapted to contain the aluminous solution to be treated, and 13 is a pipe through which ozone or ozonated air, prepared in any well known manner, as by the electrical process employed in ozone water purifiers, may be forced into said tank. The solution in the tank 12 will preferably be heated by steam introduced into said tank by a pipe 14, and the solution in the said tank, while undergoing the ozonic treatment, will preferably be thoroughly agitated by means of stirrers 15 in said tank carried by a revolving shaft 16 driven by gearing 17, operated from any suitable source of power. A suitable amount of a cheap precipitant, consisting preferably of finely powdered carbonate of lime suspended in water, will be introduced into the aluminous solution in tank 12 after the ozonic treatment. This precipitant may be contained in a tank 18 from which it can pass through a pipe 19 into tank 12. The precipitant in the tank 18 will preferably be heated by steam introduced into said tank through a pipe 20, and the said precipitant will preferably be vigorously agitated by stirrers 21 on a rotating shaft 22 driven by gearing 23 operated from any suitable source of power. Under the action of heat, the slow or gradual addition of the precipitant, and the mechanical agitation of the aluminous solution in tank 12, selective precipitation takes place, and the bulk of the iron may be precipitated as hydroxid, and may be separated from the aluminum sulfate by filtration. To this end the tank 12 is connected by a pipe 24 with a filter box or tank 25 which will collect the precipitated hydroxid of iron and permit the solution of aluminum sulfate, containing now only a small percentage of the original iron, to pass as filtrate from the filter box or tank 25 through a pipe 26 into a tank 27.

As the iron in the aluminum sulfate solution now in tank 27 will be in the ferric condition it may be separated by fractional crystallization; or the solution in tank 27 may be freed of iron present by well known methods of precipitation. To this end a precipitant contained in a tank 28, and consisting preferably of a solution of caustic soda, may be slowly discharged through a pipe 29 into the tank 27, the solution in the tank 27 being agitated by stirrers 30 carried by a rotating shaft 31 driven by gearing 32 operated from any suitable source of power. By this means practically all of the remaining iron in the aluminous solution will be precipitated as hydroxid in the tank 27, and the precipitated iron may be separated from the solution by passing the latter through a filter tank or box 33. The filtrate from said box or tank 33 will now be nearly a pure aluminum sulfate solution, and may be concentrated in an evaporating tank 34 until it contains about 17% of alumina ($Al_2O_3$) when it may be poured into lead-lined coolers. The precipitant in the tank 28 will preferably be agitated by stirrers 35 carried by a rotating shaft 36 driven by gearing 37 operated from any suitable source of power.

Preliminary to the ozonizing treatment in the tank 12 it is necessary that the aluminous substance should be brought into solution. If the aluminous material to be treated is insoluble in water, as bauxite, the first step must necessarily be to render the alumina or aluminous material soluble. This may be done by calcining the bauxite, digesting the same under heat with sulfuric acid, filtering off the earthy gangue and diluting the filtrate. This filtrate with its contents of aluminum sulfate and sulfate of iron may then be subjected to the ozonizing treatment in tank 12.

If, however, aluminous material like "alunogen" and "halotrichite," in which the alumina and iron exist in the form of sulfates which may be extracted by water, is to be subjected to the ozonic treatment in the tank 12, such aluminous material, suitably crushed, will be placed in a leaching tank 38 provided with a false perforated bottom 39 on which is spread a filter cloth. Water is then admitted to said tank 38 through a pipe 40 and the leachings from said tank, containing the alumina and iron, may then be discharged from beneath said false bottom through a pipe or spout 41 into the ozonizing and precipitating tank 12.

The amount of energy used in ozonating operations as above described will depend on various factors, as e. g. the amount of ferrous iron to be oxidized, the character of the device used for bringing the ozone or ozonated air into contact with the solution, the nature of the solution, etc. We have practised the process hereinbefore set forth with solutions containing alumina, iron (in the ferric and ferrous forms) and sulfuric acid in the following proportions:

$Al_2O_3$ -------------------- 15.36%
$Fe_2O_3$ -------------------- 4.28%
FeO -------------------- .54%
$SO_3$ -------------------- 30.94% making a somewhat basic solution, i. e., one in which the base is present in amount larger than is necessary to form a neutral salt with the acid. Working in such a solution we found that for the conversion of one pound of ferrous oxid (FeO) into ferric oxid ($Fe_2O_3$) one kw. hour was required. We used ozonated air, the air being dried before ozonation by means of calcium chlorid. The line current employed was 110 volts. This was raised to 10,000 volts by means of a transformer before the current was used in the ozonator tubes. The method employed for ozonating the solution was to pass the ozonated air through a tube into the solution.

In the removal of the bulk of the iron from the aluminous solution in tank 12 we have found it most advantageous to remove about 85% of the iron present by the precipitation treatment with powdered carbonate of lime, as outlined herein, and to remove the remaining iron from the solution by treatment with caustic soda.

The employment of our process will permit the utilization of large quantities of impure bauxite, halotrichite, etc., for the manufacture of aluminum sulfate, which impure substances have not heretofore been available for this purpose.

Having thus described our invention or discovery we claim and desire to secure by Letters Patent:

1. The herein described process for producing aluminum sulfate from aluminum sulfate solutions containing iron, consisting in subjecting such solutions to the action of ozone or ozonated air for the purpose of oxidizing the iron in the solution, precipitating the iron as hydroxid, and then separating the precipitate from the solution by filtration.

2. The herein described process for producing aluminum sulfate from aluminum sulfate solutions containing iron, consisting in subjecting such solutions to the action of ozone or ozonated air for the purpose of oxidizing the iron in the solution, precipitating the iron as hydroxid, then separating the precipitate from the solution by filtration, and then concentrating said solution by evaporation.

3. The herein described process for producing aluminum sulfate from aluminous substances containing iron, consisting in producing a solution of aluminum sulfate therefrom, subjecting such solution to the action of ozone or ozonated air for the purpose of oxidizing any iron in the solution, precipitating the iron as hydroxid, then separating the precipitate from the solution by filtration, concentrating said solution by evaporation, and finally cooling said concentrated solution.

4. The herein described process for producing aluminum sulfate from aluminous substances containing iron, consisting in producing a solution of aluminum sulfate therefrom, subjecting such solution to the action of ozone or ozonated air for the purpose of oxidizing any iron in the solution, precipitating the bulk of the iron as hydroxid, then separating the precipitate from the solution by filtration, and then removing the remaining iron in the solution by precipitation followed by a second filtration.

5. The herein described process for producing aluminum sulfate from aluminous substances containing iron, consisting in producing a solution of aluminum sulfate therefrom, subjecting such solution to the action of ozone or ozonated air for the purpose of oxidizing any iron in the solution, precipitating the bulk of the iron as hydroxid, then separating the precipitate from the solution by filtration, then removing the remaining iron in the solution by precipitation followed by a second filtration, then concentrating said solution by evaporation, and finally cooling said concentrated solution.

In testimony whereof we affix our signatures.

MAURICE BARNETT.
LOUIS BURGESS.